(12) United States Patent
Buttolo et al.

(10) Patent No.: US 12,116,824 B2
(45) Date of Patent: Oct. 15, 2024

(54) SYSTEMS AND METHODS FOR HANDS-FREE LIFTGATE ACTIVATION

(71) Applicant: Ford Global Technologies, LLC, Dearborn, MI (US)

(72) Inventors: Pietro Buttolo, Dearborn Heights, MI (US); Kirsen J. Quan, Northville, MI (US); Jeremy Alan Rawlings, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 293 days.

(21) Appl. No.: 17/652,056

(22) Filed: Feb. 22, 2022

(65) Prior Publication Data
US 2023/0265708 A1    Aug. 24, 2023

(51) Int. Cl.
*E05F 15/76* (2015.01)
*B60R 25/01* (2013.01)
(Continued)

(52) U.S. Cl.
CPC .............. *E05F 15/76* (2015.01); *B60R 25/01* (2013.01); *B60R 25/245* (2013.01);
(Continued)

(58) Field of Classification Search
CPC . B60R 25/01; B60R 25/2045; B60R 25/2054; B60R 25/245; E05F 15/73; E05F 15/76; E05F 2015/763; E05F 2015/765; E05Y 2400/44; E05Y 2400/45; E05Y 2400/858; E05Y 2900/546
See application file for complete search history.

(56) References Cited

U.S. PATENT DOCUMENTS

2012/0319502 A1* 12/2012 Van Gastel ........ G07C 9/00658
307/116
2015/0009062 A1* 1/2015 Herthan ................. G01S 7/415
342/70
(Continued)

*Primary Examiner* — Navid Z. Mehdizadeh
*Assistant Examiner* — Caitlin R McCleary
(74) *Attorney, Agent, or Firm* — Frank Lollo; Eversheds Sutherland (US) LLP

(57) ABSTRACT

This disclosure describes systems and methods for hands-free liftgate activation. An example method may include receiving a liftgate activation signal. The example method may also include receiving first data from a sensor of a vehicle at a first time and second data from the sensor at a second time. The example method may also include determining that a first difference between a second value associated with the second data and a first value associated with the first data is greater than a first threshold amount. The example method may also include disabling, based on the determination that the first difference is greater than the first threshold amount, activation of a liftgate of the vehicle. The example method may also include receiving third data from the sensor. The example method may also include determining that a second difference between a third value associated with the third data and the first value is less than a second threshold amount. The example method may also include enabling, based on the determination that the second difference is less than the second threshold amount or a determination that a first timer has elapsed, activation of the liftgate.

9 Claims, 15 Drawing Sheets

(51) Int. Cl.
*B60R 25/24* (2013.01)
*E05F 15/73* (2015.01)

(52) U.S. Cl.
CPC ... *E05F 2015/763* (2015.01); *E05F 2015/765* (2015.01); *E05Y 2400/44* (2013.01); *E05Y 2400/45* (2013.01); *E05Y 2400/858* (2013.01); *E05Y 2900/546* (2013.01)

(56) References Cited

U.S. PATENT DOCUMENTS

| | | | | |
|---|---|---|---|---|
| 2017/0357246 | A1* | 12/2017 | Herthan | E05F 15/655 |
| 2018/0248545 | A1* | 8/2018 | Bar | H03K 17/945 |
| 2020/0370333 | A1* | 11/2020 | Kubo | E05B 65/10 |
| 2021/0164283 | A1* | 6/2021 | Tamura | B60R 25/24 |

\* cited by examiner

SYSTEMS AND METHODS FOR HANDS-FREE LIFTGATE ACTIVATION

BACKGROUND

Some vehicles may be equipped with systems that allow for hands-free operation of a vehicle liftgate. Such systems may function using proximity sensors in association with the liftgate. The system may analyze signals received by the sensors to determine when a user "kicks" underneath the vehicle liftgate to provide an indication that they desire the liftgate to open or close. In some cases, however, the sensors may detect noise from the environment, which may lead to unintended activation of the liftgate.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
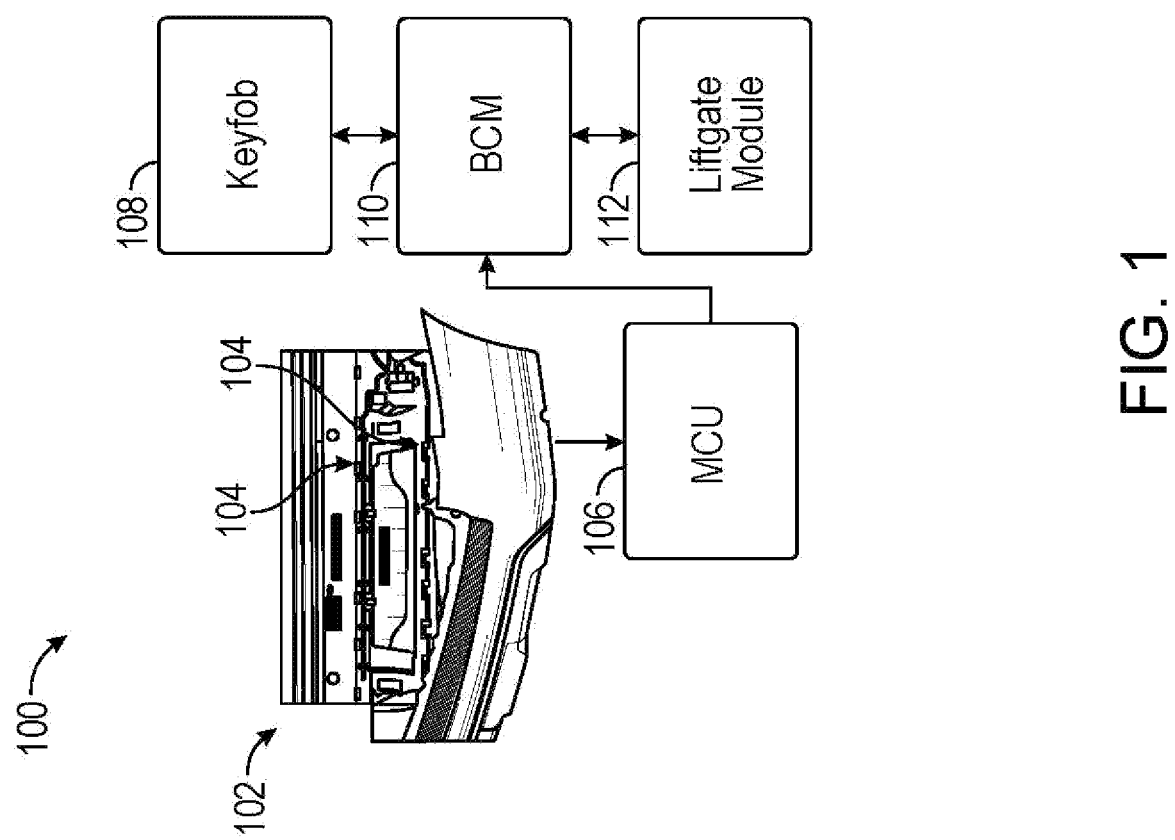
FIG. 1 illustrates an example system, in accordance with one or more embodiments of the disclosure.

This disclosure relates to, among other things, systems and methods for hands-free liftgate activation. A vehicle liftgate may refer to a vehicle door (often located at the rear of the vehicle) that may be opened to allow a user to gain access to a cargo area of the vehicle. Hands-free liftgate activation may refer to a vehicle liftgate that is configured to initiate an opening or closing action without the user being required to manually perform the opening or closing. Some systems may use proximity sensing to detect movement nearby the liftgate of the vehicle. For example, systems may include proximity sensors (and/or any other type of sensor) in the bumper of the vehicle that may obtain data to identify a movement by a user proximate to the bumper that is intended to indicate an intention by the user for the liftgate activation to be performed.

In one or more embodiments, the systems and methods may assist the hands-free liftgate activation system in discriminating between intentional activation and unintended activation of the liftgate. To accomplish this, the systems and methods may analyze patterns present in the sensors signals to detect when a user is standing in front of the vehicle bumper while loading or unloading cargo. During this time, the system may disregard signals that may otherwise be processed as liftgate activation signals.

In one or more embodiments, the systems and methods leverage a baseline "noise" level in signals being detected by the sensors to determine the proximity of the user to the vehicle while they access the cargo area. The user may first perform a liftgate activation action (for example, "kicking," or performing any other motion, under the bumper) to open the liftgate. With the liftgate open, the user may approach the liftgate to load and/or unload cargo from the vehicle cargo space. While the user is in the proximity of the bumper, the baseline signal associated with the sensors may be higher than the starting baseline (for example, the signal measured previously, with no one nearby the liftgate). This change in the baseline may assist the system in discriminating between intentional activation and unintended activation of the liftgate. There are a number of different approaches to implementing these new liftgate systems and methods, with three of such examples described in additional detail below.

In one or more embodiments, the first approach may involve, upon observance of a liftgate activation event, starting a timer. A liftgate activation event may refer to any condition that may result in the triggering of the liftgate to open and/or close. For example, a user performing a "kick" under the bumper, pressing a key fob button, pressing a switch on the liftgate, etc. While the timer is active, the system may disregard any peaks in signal amplitude that may otherwise be indicative of a "kick" event if the sensor signal baseline increases over a pre-defined threshold value. This timer may be reset to zero if the baseline drops near or below the initial baseline value. The advantage of this first approach may be that any changes may be localized to the vehicle microcontroller (MCU) that is processing the sensor signals. No changes may be required in messages to/from the liftgate controlling module, and/or in liftgate controlling module software. This first approach is illustrated further with respect to at least FIGS. 3-5.

It should be noted that, in some cases, the timer countdown may also be imitated after a detected change in the baseline, even in absence of direct activation. This may be based on the liftgate being activated through actions other than a "kick" motion by a user, such as a signal from a key fob, a switch on the vehicle liftgate, etc. This may not require any communication between the modules.

The second approach may involve changes to the liftgate module. The liftgate module may communicate current liftgate state information (for example, opened, closed, a change in state, etc.). When the MCU determines that the liftgate status is open, the MCU may check for baseline increases over a predetermined threshold value. If a valid kick is not detected, the system may disregard any peaks in signal amplitude that may otherwise be indicative of a "kick" event if the sensor signal baseline increases over a pre-defined threshold value. This may be the case until the baseline returns to near or below the initial baseline value. This second approach is illustrated further with respect to at least FIGS. 6-7.

The third approach may also require changes to the liftgate module, but no message is transmitted from the liftgate module to the MCU. When an activation action is detected, the MCU may send both an activation flag and the prior baseline value to the liftgate module. If the activation results in the liftgate opening, the liftgate module may store the associated baseline as a starting baseline value. For any additional activation requests, while the liftgate is open, the associated baseline may be compared to the starting baseline value. If the two values are different by more than a threshold value, then the activation request may be denied. This third approach is illustrated further with respect to at least FIG. 8.

Turning to the figures, FIG. 1 illustrates an example system 100, in accordance with one or more embodiments of the disclosure.

In one or more embodiments, the system 100 may illustrate different elements associated with the vehicle that may interact to perform the systems and methods described herein. For example, the system 100 may include at least a vehicle 102 including one or more sensors 104, an MCU 106, a key fob 108, a body control module (BCM) 110, and/or a liftgate module 112.

In one or more embodiments, the one or more sensors 104 may include any type of sensors. For example, the sensors may include proximity sensors, capacitive sensors, radar, lidar, ultrasonic sensors, and/or any other type of sensor. The one or more sensors 104 may be used to capture data relating to objects that are located nearby the liftgate of the vehicle for purposes of determining whether a liftgate activation event has occurred (for example, a user makes a "kick" motion or other types of movement underneath the bumper of the vehicle with the intent of triggering the liftgate to open or close). The one or more sensors 104 may be located anywhere in the vehicle, such as within the rear bumper underneath the liftgate, for example.

In one or more embodiments, the MCU 106 may be responsible for acquiring any sensor signals, processing the signal to recognize the pattern of a kick, and forwarding this decision to the BCM 110. The MCU 106 may also perform any other functions and may transmit any information to any other vehicle system (that is, the decision may not necessarily be forwarded to the BCM 110). The key fob 108 may be a mobile device that may be used by the user to perform certain functions associated with the vehicle 102. For example, the key fob 108 may include one or more buttons that may allow the user to unlock and/or lock certain doors of the vehicle, open the liftgate, etc. The BCM 110 may be responsible for higher-level control of many of the interior and/or exterior modules of the vehicle 102. With respect to hands-free operation, the BCM 110 may receive inputs from the MCU 106, a membrane switch on the liftgate, a switch on the instrument panel of the vehicle 102, and/or from the key fob 108 (via the telematics control unit (TCU) of the vehicle 102) to indicate a request from a user to open and/or close the liftgate, for example. When the BCM 110 receives the request from the MCU 106, the BCM 110 may perform a check to determine if a key fob 108 is present in close proximity of closure. If the key fob 108 is detected, the BCM 110 may forward the request to the liftgate module 112.

The liftgate module 112 may be responsible for causing the opening and/or closing actions of the vehicle liftgate, also including features such as sensing torque overload (to stop motion).

In one or more embodiments, multiple sensors (for example, two sensors or any other number of sensors) may be placed as close as possible to the surface of the vehicle, proximate to where the user is expected to kick (for example, one on the front of the rear bumper and a second on the bottom of the bumper). The goal may be to generate a repeatable signal that may be easy to differentiate from signals generated by noise factors detected by the sensors. When a sensor is triggered, a switch-activated signal may be sent to the liftgate module 112, and from there forwarded to the BCM 110. The BCM 110 may check the presence of the key-fob 108 proximate to the liftgate, and if present, may issue the command to open and/or close the liftgate back to the liftgate module 112. However, any other configurations may also be used as well. For example, a different number of sensors may be implemented at any other location in the vehicle, communications may be exchanged between the sensors 104, an MCU 106, a key fob 108, a body control module (BCM) 110, and/or a liftgate module 112 in any other manner, etc.

Figure 14:
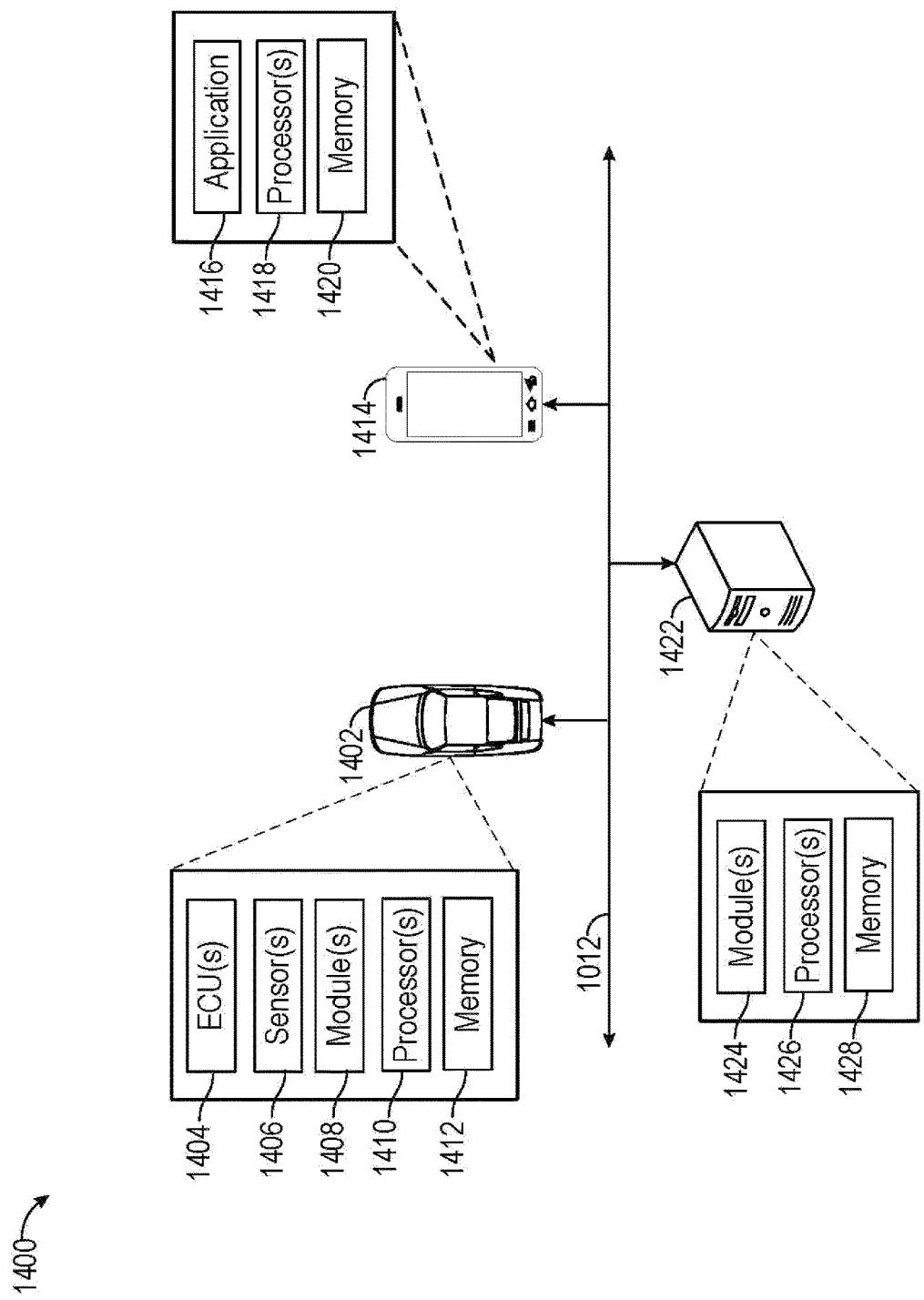
FIG. 14 illustrates an example of a system, in accordance with one or more embodiments of this disclosure.
Figure 15:
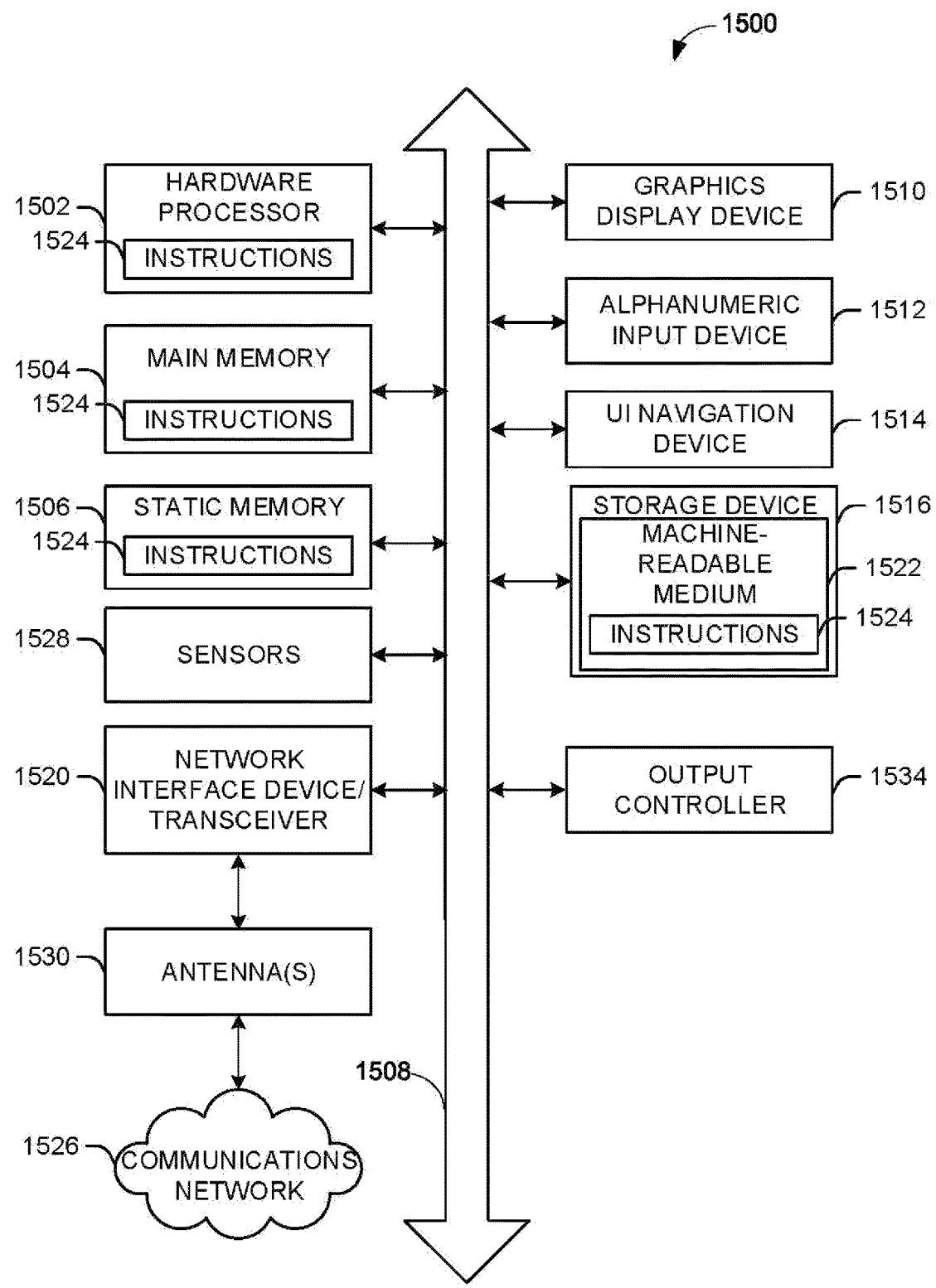
FIG. 15 illustrates an example of a computing system, in accordance with one or more embodiments of this disclosure.

Additionally, any of the elements of the system 100 may include any of the components of the machine 1500 described with respect to FIG. 15. That is, for example, the MCU 106, key fob 108, BCM 110, liftgate module 112, and/or any other element of FIG. 1 may include a processor, memory, etc. Additionally, the MCU 106, key fob 108, BCM 110, liftgate module 112, and/or any other element of FIG. 1 may be the same as or similar to any of the elements described with respect to FIG. 14 or otherwise herein. For example, the MCU 106 and BCM 110 may be the same as the ECU(s) 1404, the sensor(s) 104 may be the same as the sensor(s) 1406, etc.

Figure 2A:
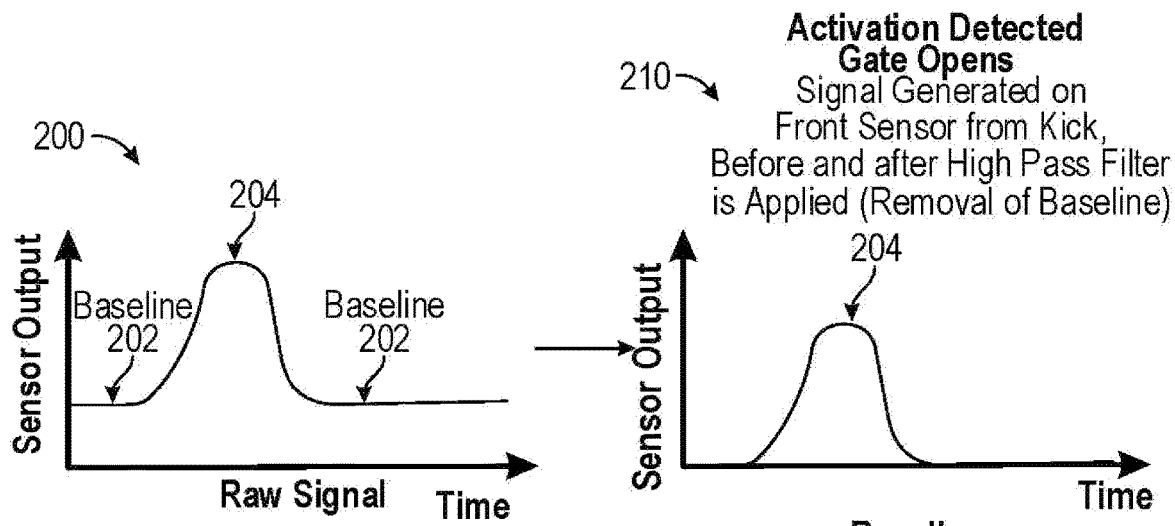
FIGS. 2A-2C illustrate example liftgate signal plots, in accordance with one or more embodiments of the disclosure.
Figure 2B:
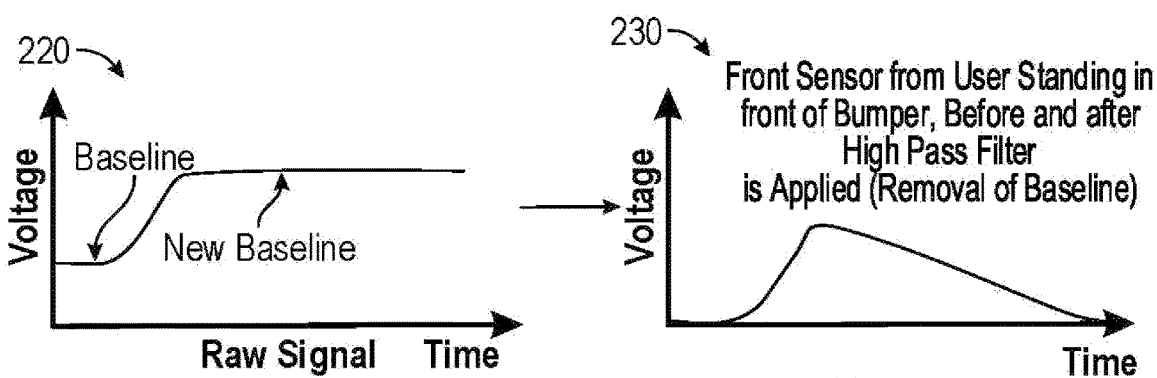
Figure 2C:
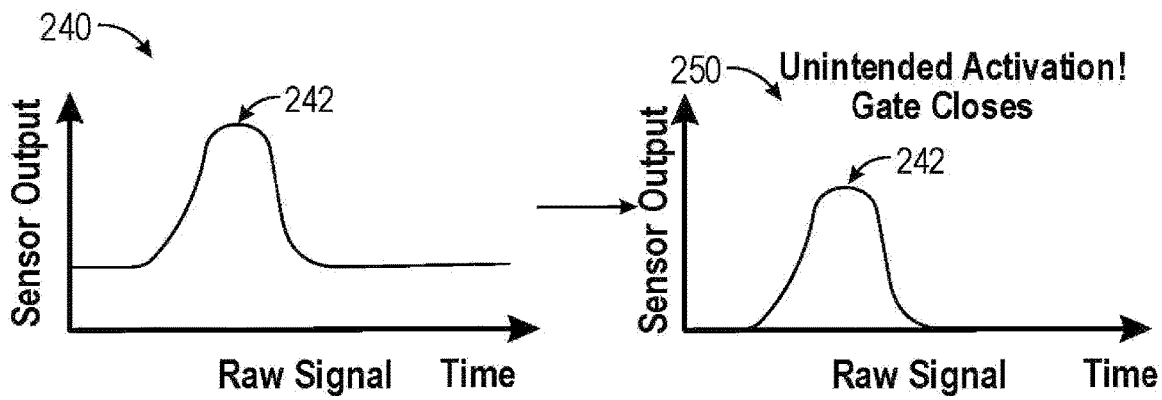

FIGS. 2A-2C illustrate example liftgate signal plots (for example, plots 200-250), in accordance with one or more embodiments of the disclosure.

In one or more embodiments, the plots 200-250 may illustrate signals associated with some hands-free liftgate systems and how in certain circumstances they may potentially result in unintended liftgate activation. With respect to these systems, to reduce the potential effect of noise on the sensor signal, two filters may be applied to any signals received from sensors (for example, sensors included in the rear bumper of the vehicle nearby the liftgate and/or at any other location). The first filter may include a low-pass filter that may be applied to remove higher frequency components that are outside the typical bandwidth associated with human motion. The second filter may include a high-pass filter with a cutoff of a few hertz (for example). The second filter may be applied to the resulting signal to remove the constant baseline component present in the signal. The plots 200 and 210 of FIG. 2A illustrate the signal generated by one of the sensors based on a user performing a kick underneath the bumper, before and after the high pass filter is applied (for example, to remove a baseline signal associated with any noise detected by the sensor). For example, plot 200 shows a signal including a baseline signal 202 and a signal peak 204 that may indicate a kick by the user. Plot 210 shows the signal after the high-pass filter is applied (for example, the baseline is removed such that any noise detected by the sensor is not presented on the plot 210. By looking at geometric properties of the two signals individually and in combination, it may be possible to determine that a kick action was performed.

Figure 3A:
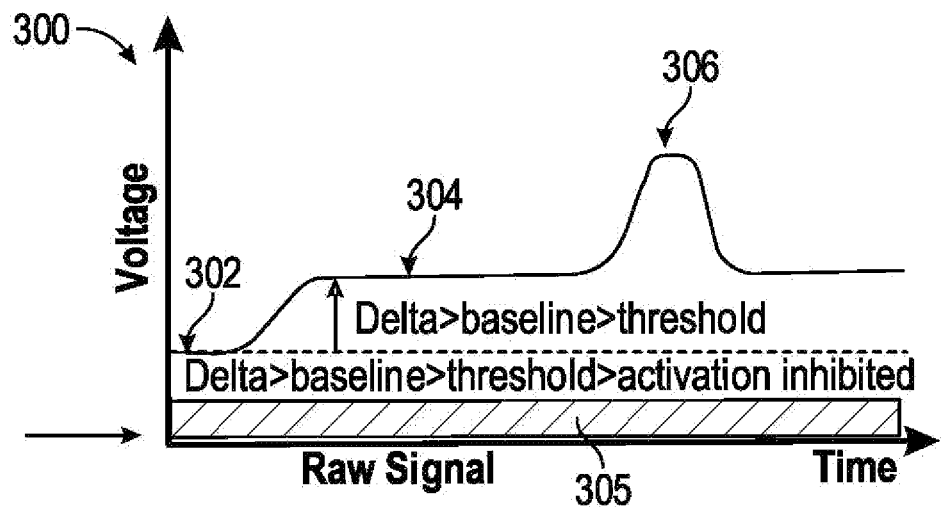
FIGS. 3A-3B illustrate example liftgate signal plots, in accordance with one or more embodiments of the disclosure.
Figure 3B:
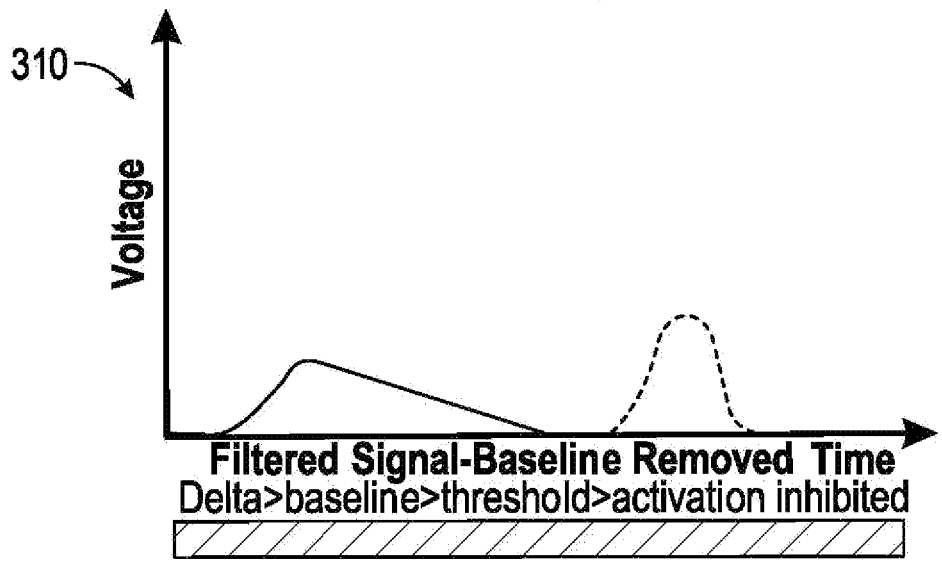

In one or more embodiments, once a peak such as peak 204 is detected, the liftgate may be triggered to open. With the liftgate open, as the user steps towards the vehicle to access the cargo space of the vehicle, a signal such as a signal illustrated in plots 220 and 230 of FIG. 2B may be generated by the bumper sensor. The high-pass filter may remove this new baseline, which may be a higher baseline than the starting signal baseline because the user may now be located closer to the sensor. With this being the case, the plots 240 and 250 of FIG. 2C may illustrate a signal that may in certain circumstances potentially result in an unintended subsequent activation of the liftgate. FIGS. 3A-3B illustrate example liftgate signal plots (for example, plots 300-310), in accordance with one or more embodiments of the disclosure.

In one or more embodiments, the plots 300-310 illustrate at a high-level when liftgate activation may be disabled in accordance with the systems and methods described herein (for example, based on at least the three approaches described below with respect to the remaining figures).

Beginning with FIG. 3A, the plot 300 may be a plot of a signal received over time by a sensor associated with the liftgate. In this particular example, the plot includes voltage values measured over time, however, any other types of measurements may also be applicable as well. The plot 300 depicts a signal including a first signal baseline 302. At a certain point in time, the baseline may increase to a second signal baseline 304. This increase in the baseline from the first signal baseline 302 to the second signal baseline 304 may result from an increasing amount of "noise" being measured by the sensor. The noise may include any measurements that are not associated with an activation action by the user (for example, a "kick") that may result in a sudden peak in amplitude as shown by the peak 306. This increase from the first signal baseline 302 to the second signal baseline 304 may occur for a number of reasons, such as a user moving more proximate to the vehicle, objects being placed nearby the vehicle, etc. The plot 310 of FIG. 3B may illustrate the same signal found in plot 300, but filtered using a high-pass filter to remove sensor signal noise.

Figure 4:
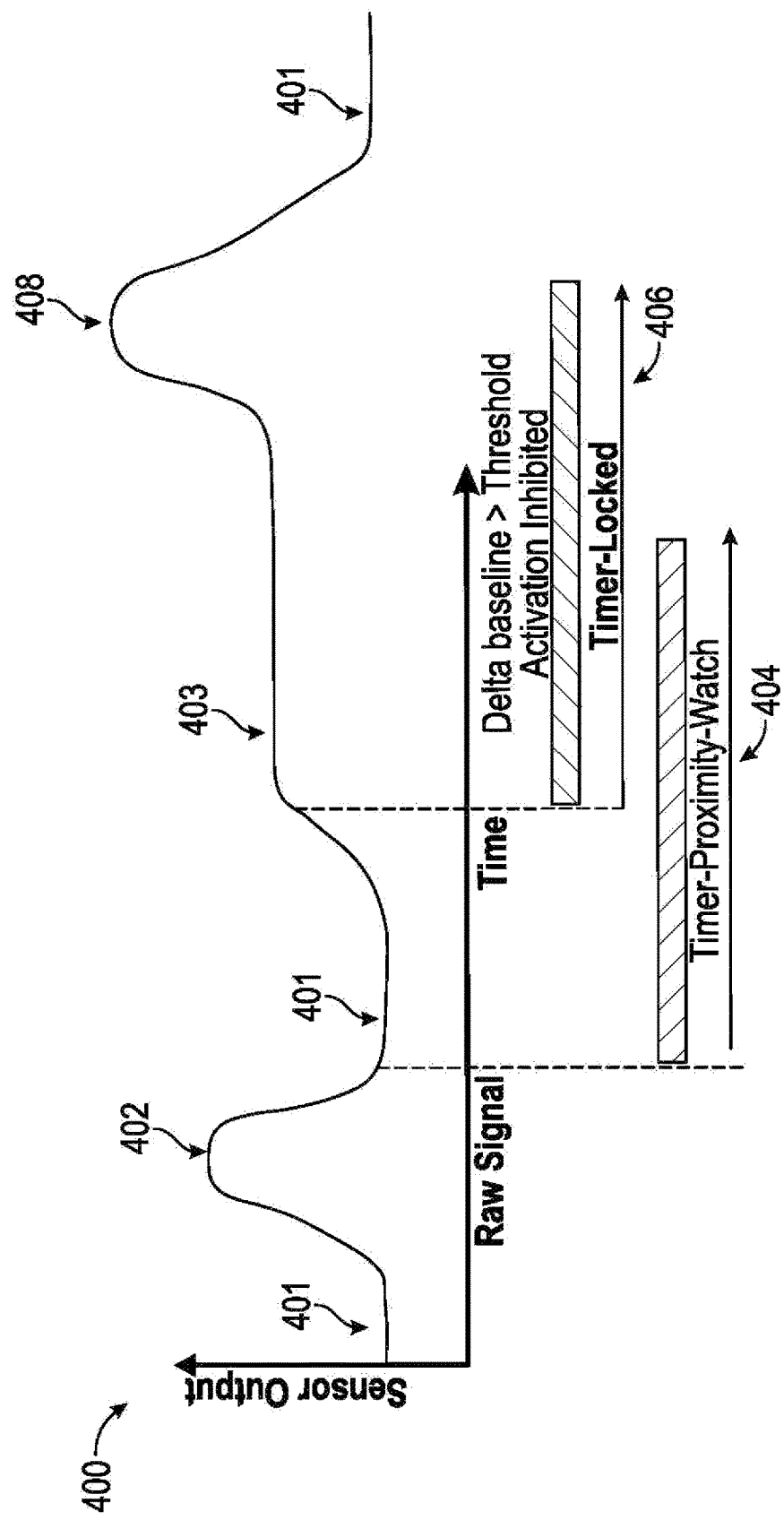
FIG. 4 illustrates an example liftgate signal plot, in accordance with one or more embodiments of the disclosure.

FIG. 4 illustrates an example liftgate signal plot 400, in accordance with one or more embodiments of the disclosure.

In one or more embodiments, the liftgate signal plot 400 may illustrate the first approach to hands-free liftgate operation. Upon observance of a sensor activation event (for example, detecting a "kick" under the bumper of the vehicle by a user), a first timer may be initiated. In the plot 400, a sensor activation event may be indicated by the peak 402 in the plot 400. This first timer may count down for a predetermined first time period 404. If during this time period an increase in the baseline sensor readings is observed, a second timer may be initiated. The second timer may be associated with a second time period 406. For example, the sensor reading baseline immediately following the activation event may be represented by baseline 401. Following this baseline 401, the base sensor measurements may increase by a given amount, which results in the second baseline 403. While the second timer is active and/or the baseline sensor reading remains above the first baseline 401, the system may disregard any peaks in signal amplitude that may otherwise be analyzed as a liftgate activation event. This second timer may be reset to zero if the baseline sensor readings drop near or below the initial baseline 401. Once the second timer reaches zero, then any subsequent peaks (not shown in the figure) in the sensor readings that may be indicative of a liftgate activation event may be uninhibited and result in the activation of the liftgate (for example, the liftgate may then open or close). Using these timers and disregarding any signals peaks that may otherwise be indicative of a liftgate activation event may assist the system in discriminating between intentional activation and unintended activation of the liftgate.

The first implementation illustrated in FIG. 4 may inhibit activation for a period of time after a significant change (not associated with a kick) is detected in the raw signal. A filtered low-pass signal extracted from the capacitive signal may be used to detect this significant change.

Figure 5:
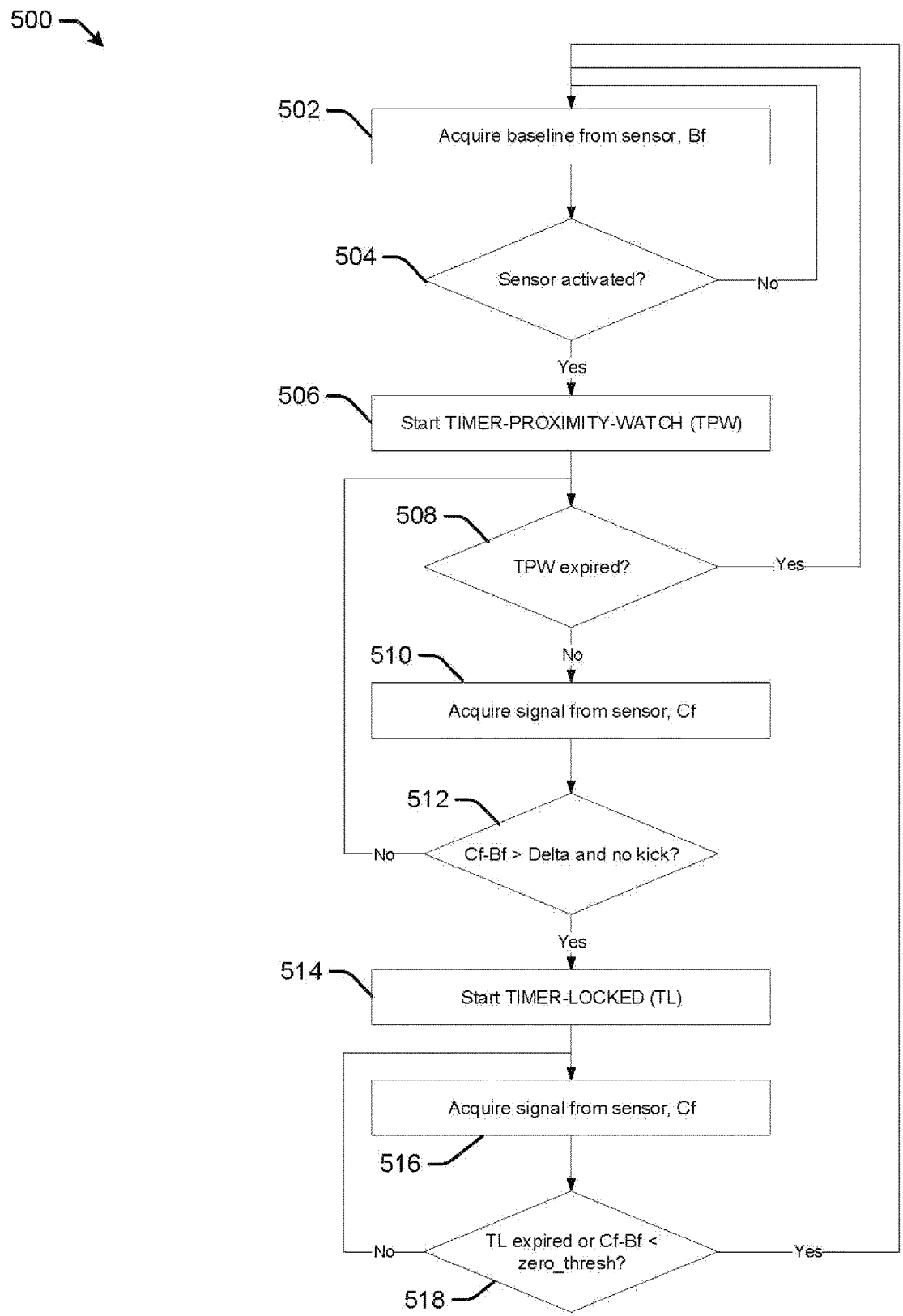
FIG. 5 illustrates an example flow diagram, in accordance with one or more embodiments of the disclosure.

FIG. 5 illustrates an example flow diagram 500, in accordance with one or more embodiments of the disclosure.

In one or more embodiments, the flow diagram 500 may illustrate a logical flow associated with the first approach depicted in FIG. 4. The flow diagram 500 may begin with operation 502, which may involve acquiring baseline sensor measurements from any sensors associated with the hands-free liftgate operation. Operation 502 may be followed by operation 504, which may involve determining if a signal indicative of a liftgate activation event was detected. The signal indicative of the liftgate activation event may include a signal with an amplitude that is above a predetermined threshold value, for example. If such a signal is not detected, the flow diagram 500 may return to operation 502. If the signal is detected, then the flow diagram 500 may proceed to operation 506. Operation 506 may involve initiating a first timer (for example, defined as TIMER-PROXIMITY-WATCH (TPW) in the figure).

Following operation 506, condition 508 may involve a determination as to whether the first timer has expired. If it is determined that the first timer has expired, then the flow diagram 500 may return to operation 502. However, if it is determined that the first timer has not yet expired, then the flow diagram 500 may proceed to operation 510. Operation 510 may involve obtaining additional measurements from the sensor. Following operation 510, condition 512 may involve determining if the additional measurements from the sensor include values that as greater than the initial baseline readings acquired in operation 502 by a threshold amount. Condition 512 may also involve determining that no liftgate activation event has been detected (for example, a "kick" action by the user, a key fob signal, etc.). If it is determined that the difference is greater than the threshold amount and/or no liftgate activation event has been detected, then the flow diagram 500 may proceed to operation 514. Otherwise, the flow diagram 500 may return to condition 508.

Operation 514 may involve initiating a second timer (for example, defined as TIMER-LOCKED (TL) in the figure). Operation 514 may be followed by operation 516, which may involve obtaining additional measurements from the sensor. Operation 516 may be followed by condition 518. Condition 518 may involve determining whether the second timer has expired and/or if a difference between the additional measurements obtained in operation 516 and the baseline sensor readings obtained in operation 502 is less than a threshold value. The goal of the condition 518 may be to determine whether the current baseline sensor readings return back to the initial baseline sensor readings (or within a given error threshold, which is the threshold value that is used for the comparison). If the condition 518 is not met, then the flow diagram 500 may return to operation 516 and obtain additional sensor readings. If the condition 518 is met, then the flow diagram 500 may return back to operation 502.

Figure 6:
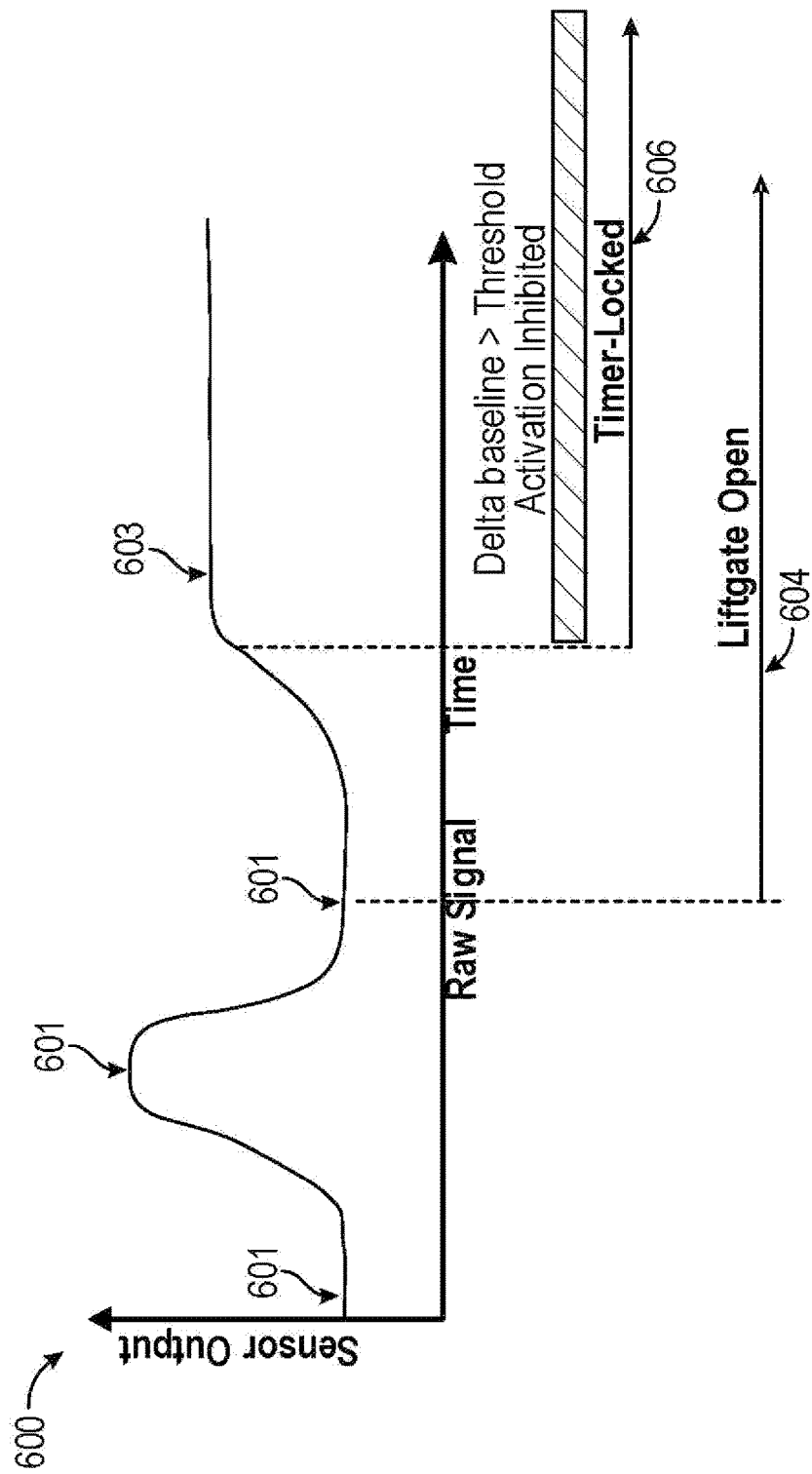
FIG. 6 illustrates an example liftgate signal plot, in accordance with one or more embodiments of the disclosure.

FIG. 6 illustrates an example liftgate signal plot 600, in accordance with one or more embodiments of the disclosure.

In one or more embodiments, the liftgate signal plot 600 may illustrate the second approach to hands-free liftgate operation. The second approach illustrated in plot 600 may be similar to the first approach illustrated in plot 600. However, the second approach may differ from the first approach in that upon observance of a sensor activation event (for example, detecting a "kick" under the bumper of the vehicle by a user), a first timer may not necessarily be required. Rather, the second approach may involve determining that the liftgate is open. This may be determined through any number of suitable vehicle systems that detect the state of the liftgate (for example, sensors, etc.). If an increase in the baseline sensor readings is observed during the period of time 604 that the liftgate is open, then a timer may be initiated. The timer may be associated with a second time period 606. For example, the sensor reading baseline immediately following the activation event may be represented by baseline 601. Following this baseline 601, the base sensor measurements may increase by a given amount, which may result in the second baseline 603. While the timer is active and/or the baseline sensor reading remains above the first baseline 601, the system may disregard any peaks in signal amplitude that may otherwise be analyzed as a liftgate activation event. This second timer may be reset to zero if the baseline sensor readings drop near or below the initial baseline 601. Once the timer reaches zero, then any subsequent peaks (not shown in the figure) in the sensor readings that may be indicative of a liftgate activation event may be uninhibited and result in the activation of the liftgate (for example, the liftgate may then open or close).

Figure 7:
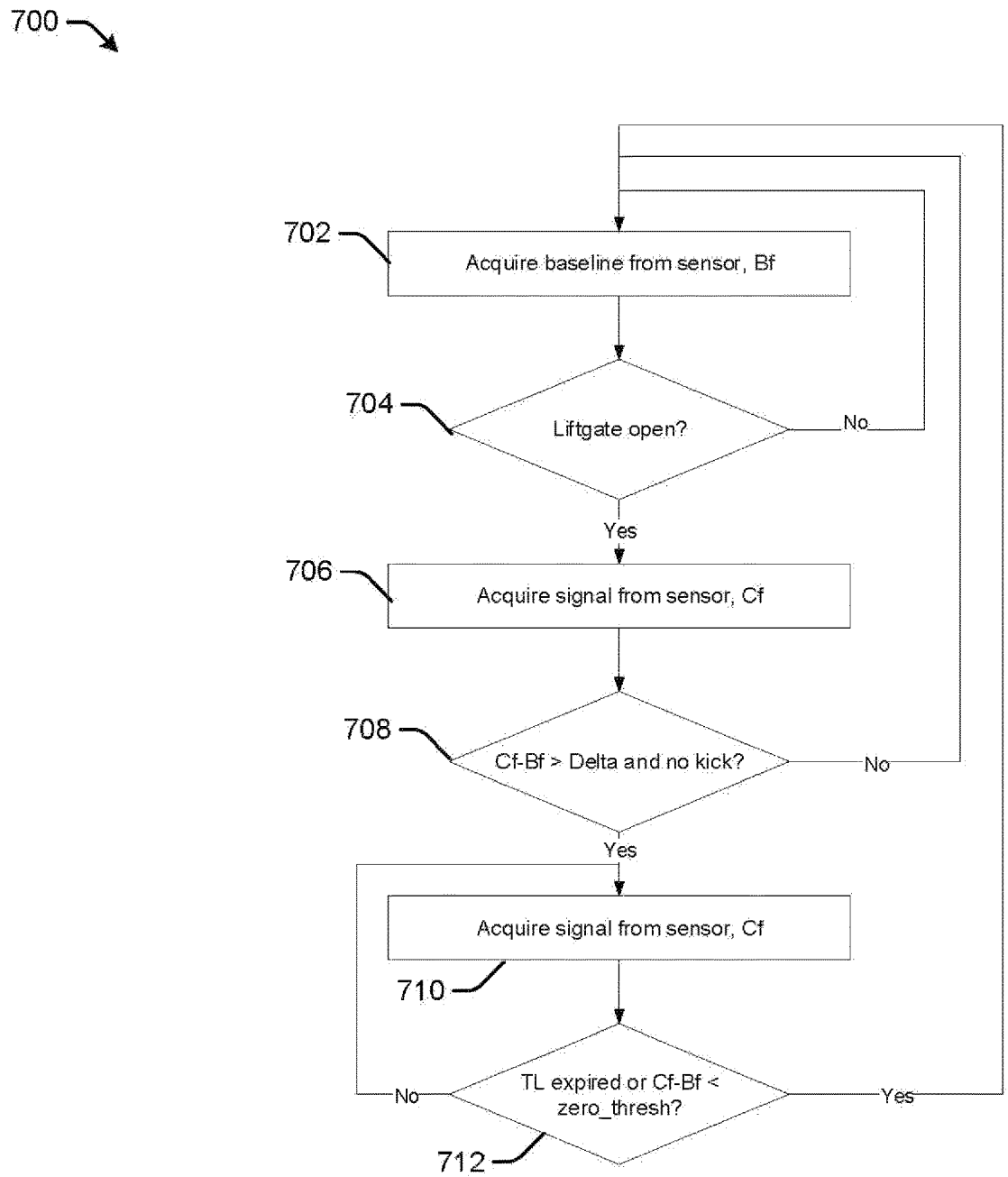
FIG. 7 illustrates an example flow diagram, in accordance with one or more embodiments of the disclosure.

FIG. 7 illustrates an example flow diagram 700, in accordance with one or more embodiments of the disclosure.

In one or more embodiments, the flow diagram 700 may illustrate a logical flow associated with the second approach depicted in FIG. 6. The flow diagram 700 may begin with operation 702, which may involve acquiring baseline sensor measurements from any sensors associated with the hands-free liftgate operation. Operation 702 may be followed by operation 704, which may involve determining if the liftgate is currently open or a liftgate open process has been initiated. If it is determined that the liftgate is currently open or a liftgate open process has been initiated, then the flow diagram 700 may proceed to operation 706. Otherwise, the flow diagram 700 may return to operation 702.

Operation 706 may involve obtaining additional measurements from the sensor. Following operation 706, condition 708 may involve determining if the additional measurements from the sensor include values that as greater than the initial baseline readings acquired in operation 702 by a threshold amount. Condition 708 may also involve determining that no liftgate activation event has been detected (for example, a "kick" action by the user, a key fob signal, etc.). If it is determined that the difference is greater than the threshold amount and/or no liftgate activation event has been detected, then the flow diagram 700 may proceed to operation 710. Otherwise, the flow diagram 700 may return to condition 702.

Operation 710 may involve obtaining additional measurements from the sensor. Operation 710 may be followed by condition 712. Condition 712 may involve determining whether the second timer has expired and/or if a difference between the additional measurements obtained in operation 710 and the baseline sensor readings obtained in operation 702 is less than a threshold value. The goal of the condition 712 may be to determine whether the current baseline sensor readings return back to the initial baseline sensor readings (or within a given error threshold, which is the threshold value that is used for the comparison). If the condition 712 is not met, then the flow diagram 700 may return to operation 710 and obtain additional sensor readings. If the condition 712 is met, then the flow diagram 700 may return back to operation 702.

Figure 8:
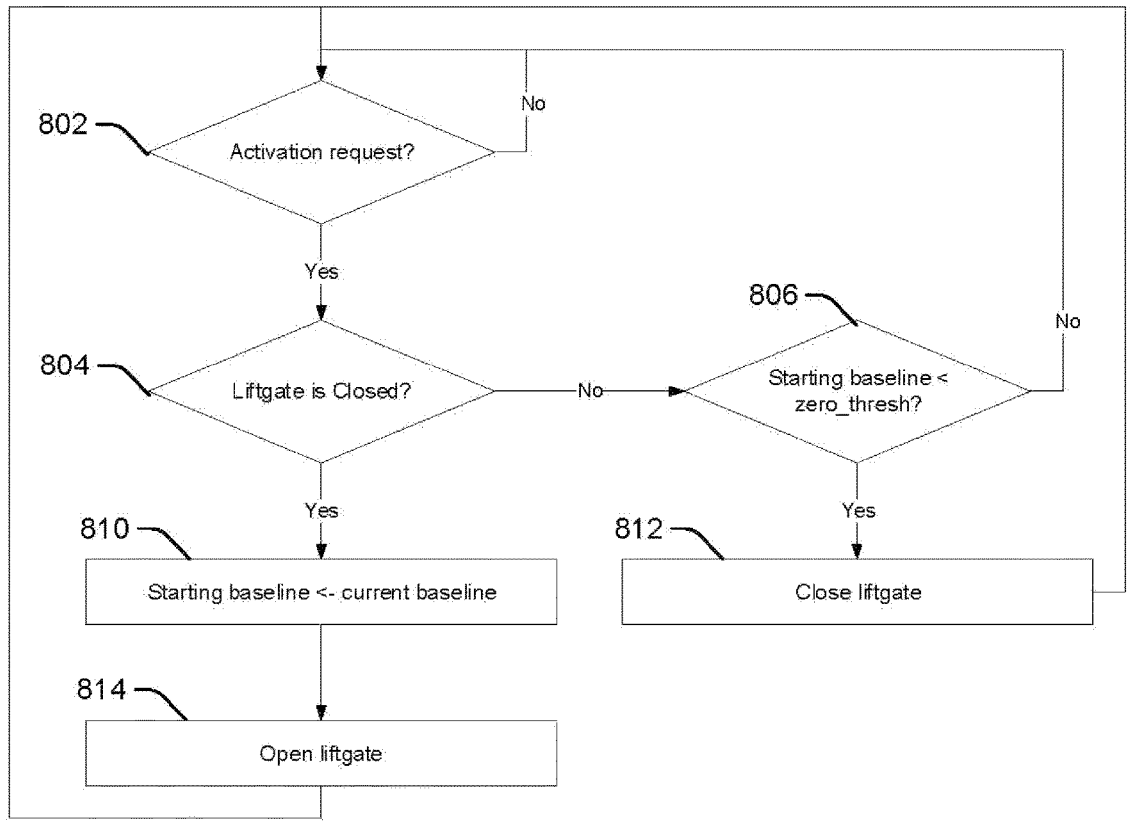
FIG. 8 illustrates an example flow diagram, in accordance with one or more embodiments of the disclosure.

FIG. 8 illustrates an example flow diagram 800, in accordance with one or more embodiments of the disclosure.

In one or more embodiments, the flow diagram 800 may illustrate a logical flow associated with the third approach. The flow diagram 800 may begin with operation 802, which may involve determining whether an activation request has been received. If an activation request has been received, the flow diagram 800 may proceed to condition 804. Otherwise, the flow diagram 800 may return back to condition 802. Condition 804 may involve determining if the liftgate is closed. Determined through any suitable vehicle systems, such as those used to determine if the liftgate is open. If it is determined that the liftgate is closed, then the flow diagram 800 may proceed to operation 810. If it is determined that the liftgate is open, then the flow diagram 800 may proceed to condition 806.

Condition 806 may involve determining whether the starting baseline value is less than a threshold value. If this condition is met, then the flow diagram 800 may proceed to operation 812. If the condition is not met, then the flow diagram 800 may return to condition 802. Operation 812 may involve closing the liftgate.

Operation 810 may involve adjusting a prior baseline value based on updated signals received from any of the vehicle sensors. The starting baseline may be the baseline (or static component of the sensors) that is established before the activation-inhibit timer is started. The starting baseline may be representative of a baseline indicative of users or objects not being detected proximate to the bumper of the vehicle. The current baseline may be the static content of any sensor signals while the timer is active. If a user or object is proximate to the bumper, this signal may be higher than the starting baseline. When the user or object moves away from the bumper, the baseline may drop to the original value prior to the timer countdown. Operation 810 may be followed by operation 814, which may involve opening the liftgate.

Figure 9:
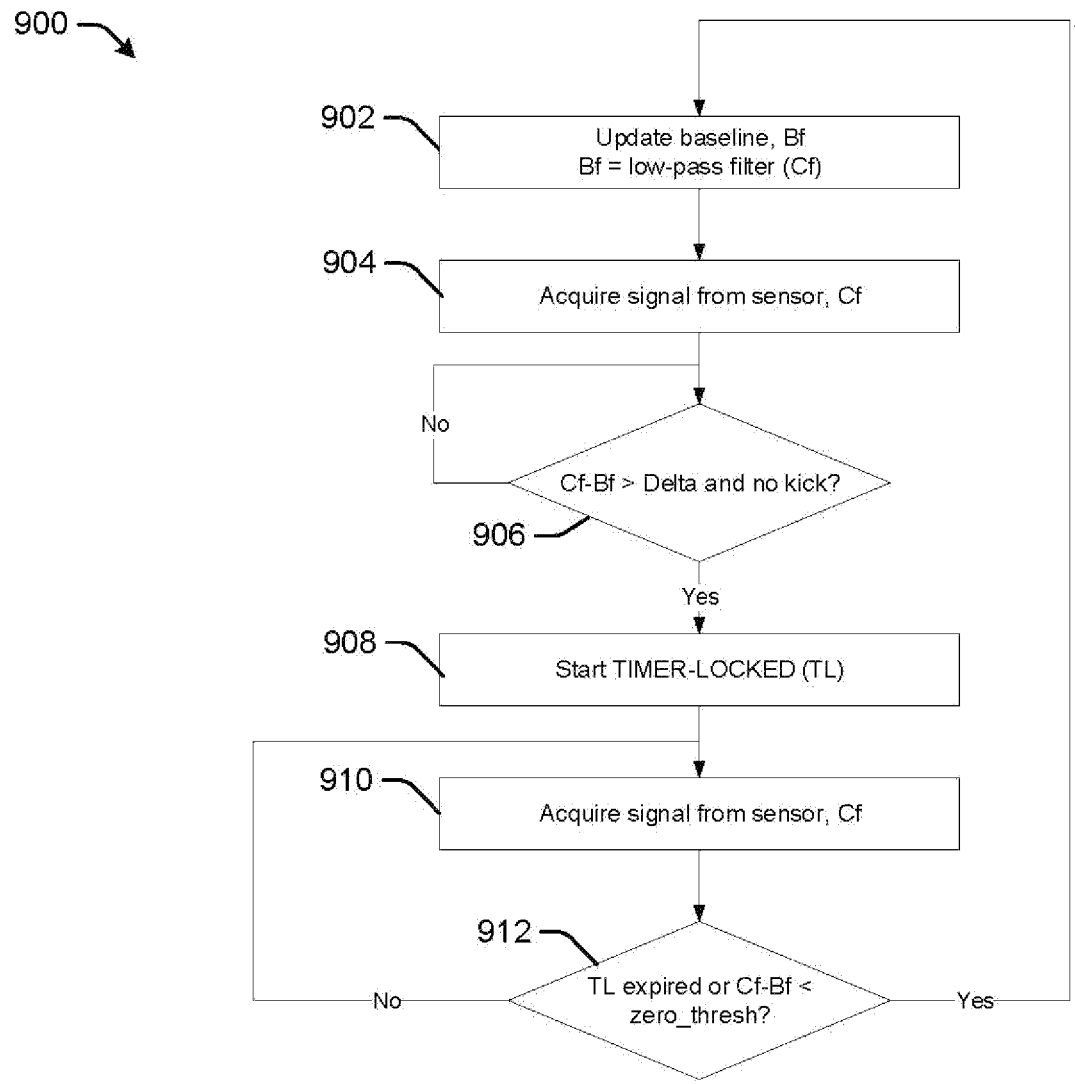
FIG. 9 illustrates an example flow diagram, in accordance with one or more embodiments of the disclosure.

FIG. 9 illustrates an example flow diagram 900, in accordance with one or more embodiments of the disclosure.

In one or more embodiments, the flow diagram 900 may illustrate a modified version of flow diagram 500. This modification may address scenarios where a user opens the liftgate using a switch on the vehicle, a key-fob, and/or any other method other than using the hands-free "kick" operation described herein.

In one or more embodiments, the flow diagram 900 may begin with operation 902, which may involve updating a baseline value. Operation 904 may involve obtaining additional measurements from the sensor. Following operation 904, condition 906 may involve determining if the additional measurements from the sensor include values that as greater than the initial baseline readings acquired in operation 902 by a threshold amount. Condition 906 may also involve determining that no liftgate activate event has been detected (for example, a "kick" action by the user). If it is determined that the difference is greater than the threshold amount and/or no liftgate activate event has been detected, then the flow diagram 900 may proceed to operation 908. Otherwise, the flow diagram 900 may return to condition 906.

Operation 908 may involve initiating a timer (for example, defined as TIMER-LOCKED (TL) in the figure). Operation 908 may be followed by operation 910, which may involve obtaining additional measurements from the sensor. Operation 910 may be followed by condition 912. Condition 912 may involve determining whether the timer has expired and/or if a difference between the additional measurements obtained in operation 910 and the baseline sensor readings obtained in operation 902 is less than a threshold value. If the condition 912 is not met, then the flow diagram 900 may return to operation 910 and obtain additional sensor readings. If the condition 912 is met, then the flow diagram 900 may return back to operation 902.

Figure 10:
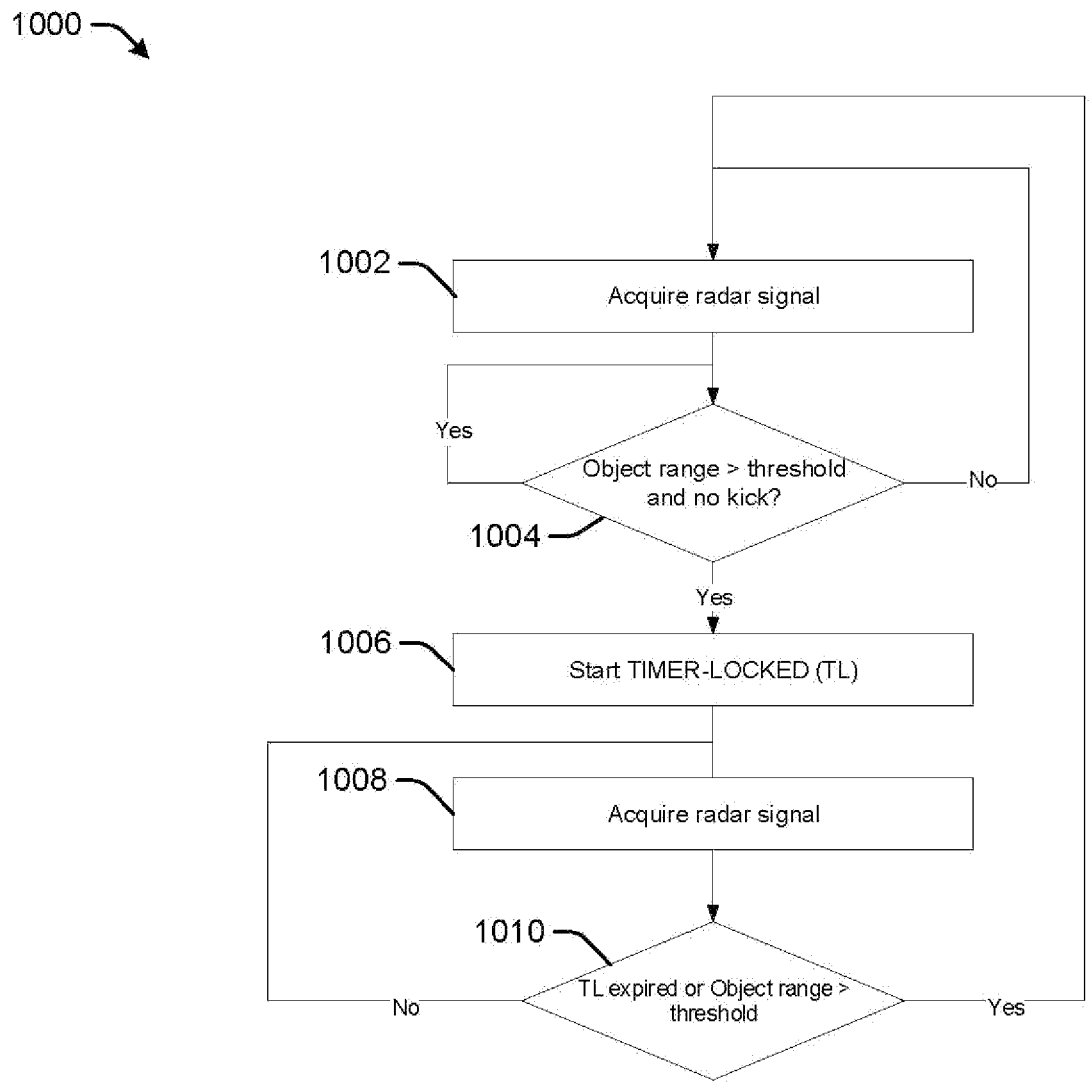
FIG. 10 illustrates an example flow diagram, in accordance with one or more embodiments of the disclosure.

FIG. 10 illustrates an example flow diagram 1000, in accordance with one or more embodiments of the disclosure.

In one or more embodiments, the flow diagram 1000 may represent a modification to flow diagram 900 for use in association with radar. The following may be described with respect to a frequency-modulation-continuous-waveform radar (FMCW), but the concept may also be applicable to other types of pulse waveforms. The radar may output a signal (for example, a "chirp"). This signal may traverse the environment and bounce back to the source of the radar when it encounters an object. Transmitted and received signals may be combined (for example, using a mixer), converted into a digital signal, and processed. Typically, processing may include converting the time signal into the frequency domain (for example, using a Fast Fourier Transform (FFT)). If multiple surfaces/objects are reflecting, the FFT may exhibit peaks at different frequencies (the limitation in how well the radar can discriminate is based on its resolution). This may be linked to the bandwidth of the transmitted chirp. Additionally, multiple chirps may be sent in a sequence called a "frame." The FFT may be performed on the combined signal formed mixing the sent and received waveform for each chirp and stored as a row in a matrix. An additional FFT may be performed on each column on the matrix thus built. The data on each column may represent the measured speed. If multiple receiving antennas are present, additional data may be collected and processed to determine the angle of the detected object.

In one or more embodiments, the flow diagram 1000 may begin with operation 1002, which may involve obtaining radar signal measurements. Following operation 1002, condition 1004 may involve determining if an object range determined based on the radar signal measurements is greater than a threshold range. Condition 1002 may also involve determining that no liftgate activate event has been detected (for example, a "kick" action by the user). If it is determined that the difference is greater than the threshold amount and/or no liftgate activate event has been detected, then the flow diagram 1000 may proceed to operation 1006. Otherwise, the flow diagram 1000 may return to condition 1004.

Operation 1006 may involve initiating a timer (for example, defined as TIMER-LOCKED (TL) in the figure). Operation 1006 may be followed by operation 1008, which may involve obtaining additional radar signal measurements. Operation 1008 may be followed by condition 1010. Condition 1010 may involve determining whether the timer has expired and/or if a difference between an object range associated with the additional measurements obtained in operation 1008 is greater than a threshold range value. If the condition 1010 is not met, then the flow diagram 1000 may return to operation 1008 and obtain additional sensor readings. If the condition 1010 is met, then the flow diagram 1000 may return back to operation 1002.

Figure 11:
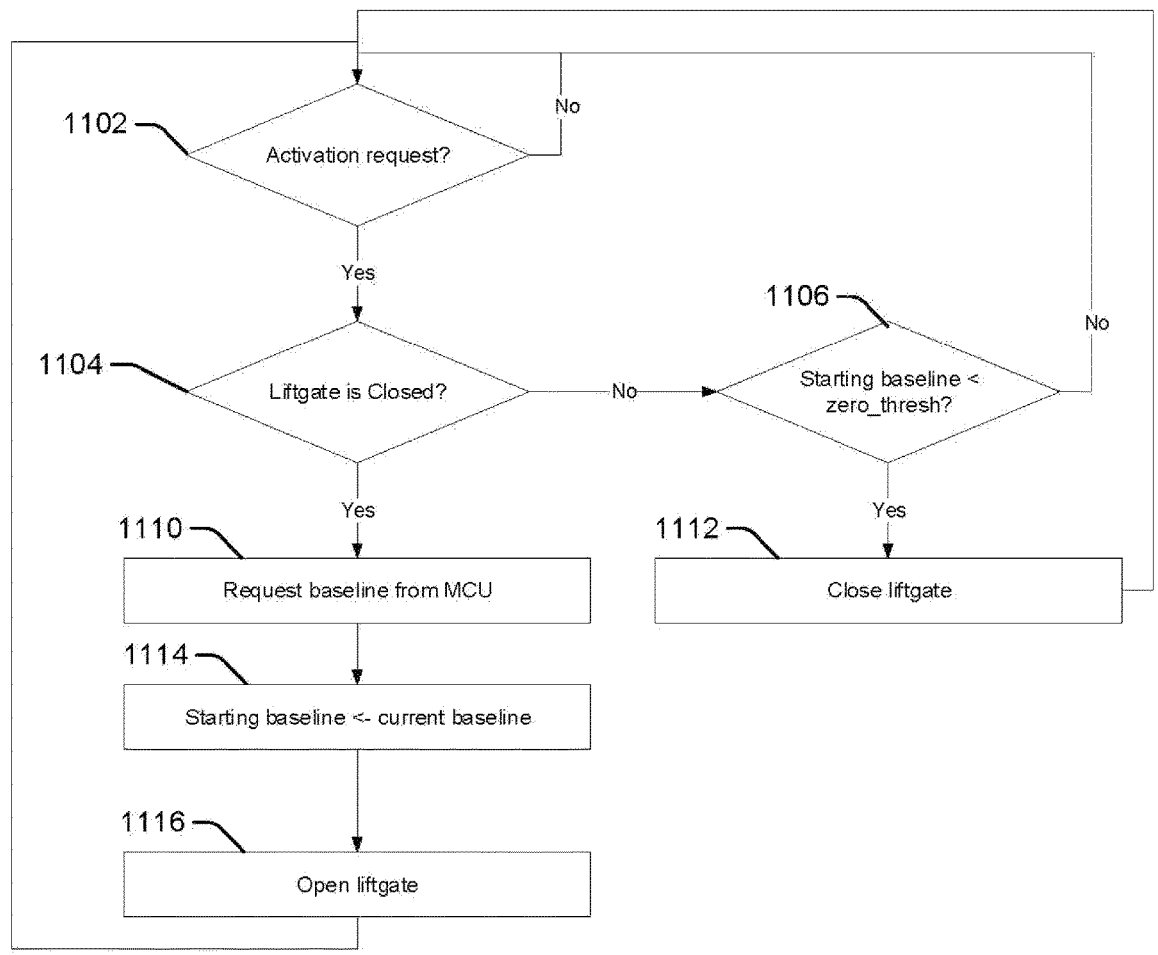
FIG. 11 illustrates an example flow diagram, in accordance with one or more embodiments of the disclosure.

FIG. 11 illustrates an example flow diagram 1100, in accordance with one or more embodiments of the disclosure.

In one or more embodiments, the flow diagram 1100 may illustrate a modified version of flow diagram 800. This modification may address scenarios where a user opens the liftgate using a switch on the vehicle, a key-fob, and/or any other method other than using the hands-free "kick" operation described herein.

The flow diagram 1100 may begin with operation 1102, which may involve determining whether an activation request has been received. If an activation request has been received, the flow diagram 1100 may proceed to condition 1104. Otherwise, the flow diagram 800 may return back to condition 1102. Condition 1104 may involve determining if the liftgate is closed. Determined through any suitable vehicle systems, such as those used to determine if the liftgate is open. If it is determined that the liftgate is closed, then the flow diagram 1100 may proceed to operation 1110. If it is determined that the liftgate is open, then the flow diagram 1100 may proceed to condition 1106.

Condition 1106 may involve determining whether the starting baseline value is less than a threshold value. If this condition is met, then the flow diagram 1100 may proceed to operation 1112. If the condition is not met, then the flow diagram 1100 may return to condition 1102. Operation 1112 may involve closing the liftgate.

Operation 1110 may involve requesting baseline data from the MCU. Operation 11110 may be followed by operation 1114, which may involve adjusting a prior baseline value based on updated signals received from any of the vehicle sensors, similar to operation 810 of FIG. 8. Operation 1114 may be followed by operation 1116, which may involve opening the liftgate.

Figure 12:
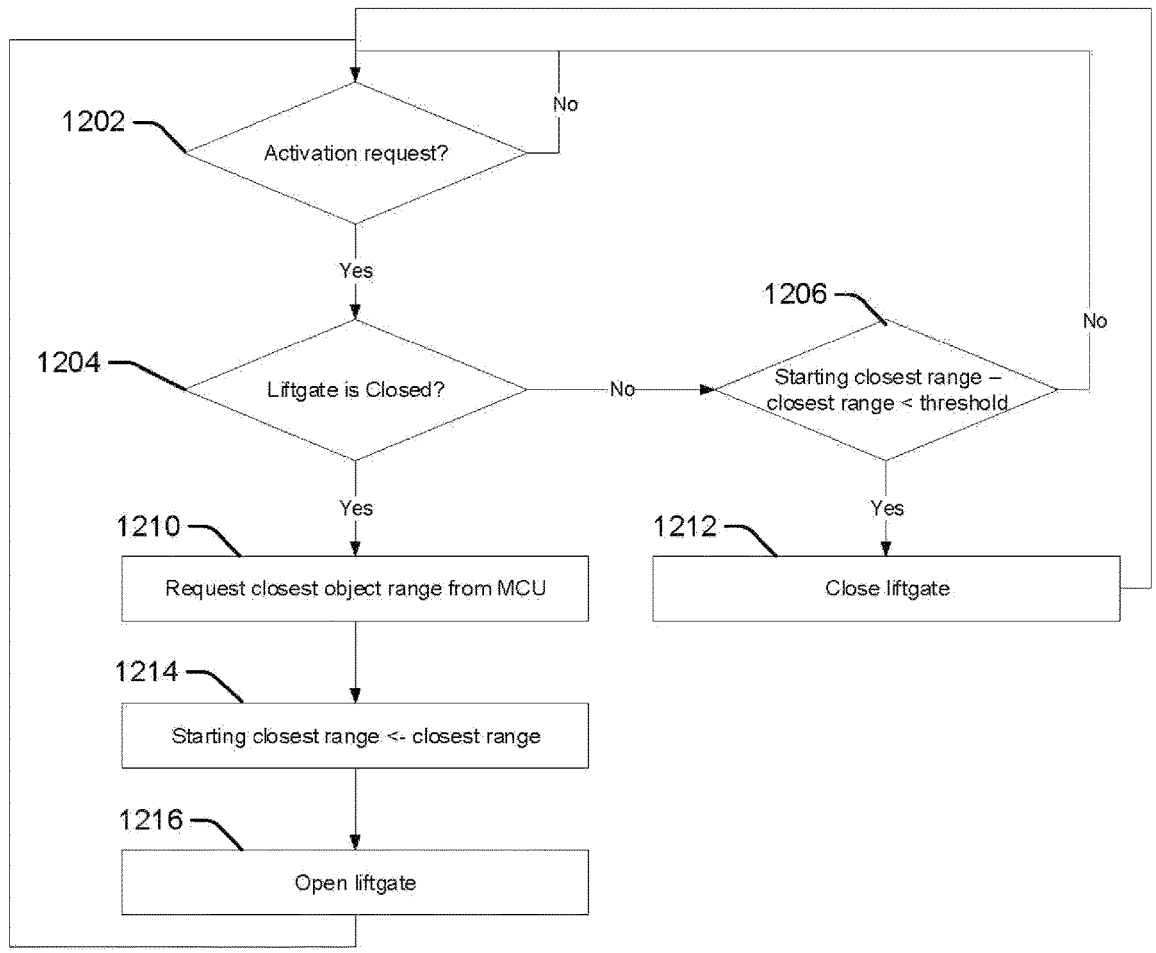
FIG. 12 illustrates an example flow diagram, in accordance with one or more embodiments of the disclosure.

FIG. 12 illustrates an example flow diagram 1200, in accordance with one or more embodiments of the disclosure.

In one or more embodiments, the flow diagram 1200 may represent a modification to flow diagram 1100 for use in association with radar (for example, radar transceivers may be used as the sensors to detect user movement nearby the vehicle liftgate).

The flow diagram 1200 may begin with operation 1202, which may involve determining whether an activation request has been received. If an activation request has been received, the flow diagram 1200 may proceed to condition 1204. Otherwise, the flow diagram 1200 may return back to condition 1202. Condition 1204 may involve determining if the liftgate is closed. Determined through any suitable vehicle systems, such as those used to determine if the liftgate is open. If it is determined that the liftgate is closed, then the flow diagram 1200 may proceed to operation 1210. If it is determined that the liftgate is open, then the flow diagram 1210 may proceed to condition 1206.

Condition 1206 may involve determining whether a difference between a starting closest range value and a closest range value is less than a threshold value. If this condition is met, then the flow diagram 1200 may proceed to operation 1212. If the condition is not met, then the flow diagram 1200 may return to condition 1202. Operation 1212 may involve closing the liftgate.

Operation 1210 may involve requesting baseline data from the MCU. Operation 1210 may be followed by operation 1214, which may involve adjusting a prior closest value based on updated signals received from any of the vehicle sensors. For example, this may be similar to operation 810 of FIG. 8 and operation 1110 of FIG. 10, but may involve closest range values based on radar rather than baselines based on proximity sensors. Operation 1214 may be followed by operation 1216, which may involve opening the liftgate.

Figure 13:
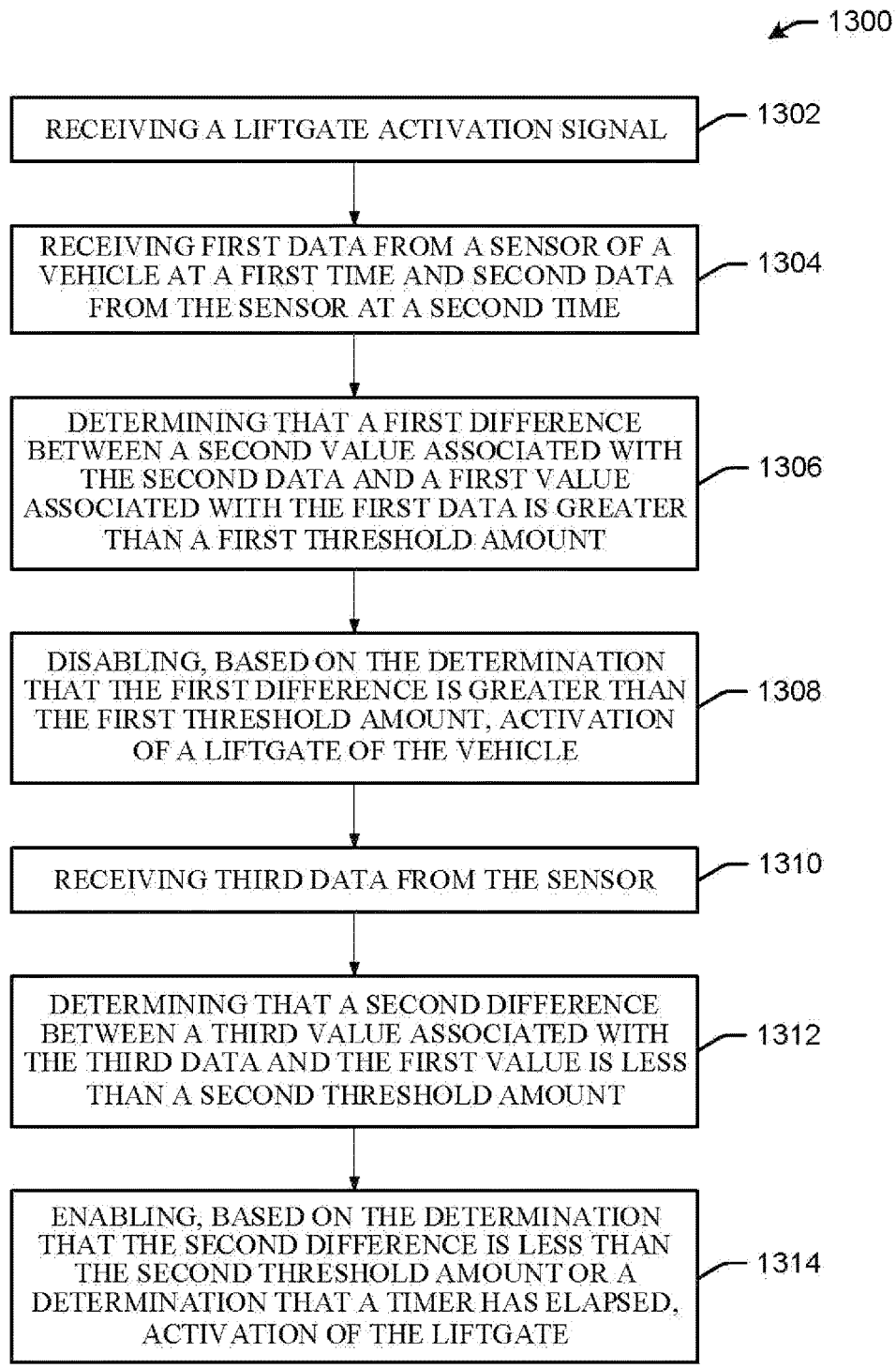
FIG. 13 illustrates an example method, in accordance with one or more embodiments of the disclosure.

FIG. 13 illustrates an example method 1300, in accordance with one or more embodiments of this disclosure. In one or more embodiments, the method 1300 may be implemented by any of the elements of FIG. 1 and/or FIG. 14, and/or a combination of such elements, for example). At block 1302, the method 1300 may include receiving a liftgate activation signal. At block 1304, the method 1300 may include receiving first data from a sensor of a vehicle at a first time and second data from the sensor at a second time. At block 1306, the method 1300 may include determining that a first difference between a second value associated with the second data and a first value associated with the first data is greater than a first threshold amount. At block 1308, the method 1300 may include disabling, based on the determination that the first difference is greater than the first threshold amount, activation of a liftgate of the vehicle. At block 1310, the method 1300 may include receiving third data from the sensor. At block 1312, the method 1300 may include determining that a second difference between a third value associated with the third data and the first value is less than a second threshold amount. At block 1314, the method 1300 may include enabling, based on the determination that the second difference is less than the second threshold amount or a determination that a first timer has elapsed, activation of the liftgate.

In one or more embodiments, the method 1300 may also include initiating, based on receiving the liftgate activation signal, a second timer associated with a first time period, wherein the first timer is initiated based on the determination that the first difference is greater than the first threshold amount occurring during the first time period.

In one or more embodiments, the liftgate activation signal comprises at least one of: a value measured by the sensor being above a threshold value and/or a signal from a key fob associated with a user.

In one or more embodiments, the method 1300 may also include receiving a second liftgate activation signal. The method 1300 may also include receiving third data from the sensor at a third time, wherein the sensor is a radar transceiver, and wherein the third data indicates a range of a user or object from the vehicle. The method 1300 may also include determining that the range is greater than a threshold amount. The method 1300 may also include initiating a timer based on the range being greater than the threshold amount.

In one or more embodiments, the first data and the second data indicate proximity of a user or object to a bumper of the vehicle.

In one or more embodiments, the sensor is at least one of: a capacitive sensor, an ultrasonic sensor, radar, and/or lidar.

FIG. 14 illustrates an example of a system 1400, in accordance with one or more embodiments of this disclosure. In one or more embodiments, the system 1400 may include at least one or more vehicles 1402, one or more user devices 1414, and/or one or more servers 1422.

In one or more embodiments, a vehicle 1402 may be a vehicle that may include any type of vehicle (for example, electric vehicle, hybrid vehicle, internal combustion engine vehicle, autonomous or semi-autonomous vehicle, etc.). For example, the vehicle may include one or more sensors 1414, such as radar, lidar, ultra-wideband, capacitive, and/or any other types of sensors that may be capable of capturing data. For example, the one or more sensors 1406 may be used to capture data relating to the proximity of a user to the vehicle to determine if the user has performed a liftgate activation movement, such as a "kick" underneath the bumper of the vehicle. These sensors 1414 may be disposed within a rear bumper of the vehicle proximate to the liftgate. The sensors 1414 may also be disposed in any other location within the tailgate or the vehicle in general as well. The vehicle may also include one or more ECU(s) 1404, such as the MCU 106, the BCM 110, etc. Additionally, the vehicle may also include one or more module(s) 1408, such as the liftgate module 112.

In one or more embodiments, the one or more user devices 1414 may be devices that may be used by a user associated with a vehicle 1402. For example, a user device 1414 may include a smart phone, key fob, etc. A user device 1406 may allow a user to perform any number of functions, such as sending a liftgate activation signal, and/or any other functions. Additionally, the vehicle 1402 may include a human-machine interface (HMI) that may allow the user to perform the same or similar functions.

In one or more embodiments, the one or more servers 1408 may be remote server(s) that may perform any of the analyses described herein. For example, the remote server(s)1422 may perform any processing relating to inhibiting liftgate activation and/or any other processing described herein. As aforementioned, any of the operations described herein as being performed by the vehicle 1402 may also be performed by the remote server 1422.

In one or more embodiments, any of the one or more vehicles 1402, one or more user devices 1414, and/or one or more servers 1422 and/or any other elements of the system 1400 may include any of the components of the machine 1500 described with respect to FIG. 15. That is, as illustrated in the figure, these elements of the system 1400 may include one or more processor(s) and memory, as well as at least any other elements described as being included in the machine 1000. That is, although the figure may only depict a particular element of system 1400 as having one or more processors, memory, and one or more modules, this may not be intended to be limiting in any way.

FIG. 15 depicts a block diagram of an example machine 1500 upon which any of one or more techniques (e.g., methods) may be performed, in accordance with one or more example embodiments of the present disclosure. In other embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environments. The machine 1500 may be a personal computer (PC), a tablet PC, a set-top box (STB), a personal digital assistant (PDA), a mobile telephone, a smart key fob, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating.

A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific task when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1500 may include a hardware processor 1502 (e.g., a central processing unit (CPU), a graphics processing unit (GPU), a hardware processor core, or any combination thereof), a main memory 1504 and a static memory 1506, some or all of which may communicate with each other via an interlink (e.g., bus) 1508. The machine 1500 may further include a graphics display device 1510, an alphanumeric input device 1512 (e.g., a keyboard), and a user interface (UI) navigation device 1514 (e.g., a mouse). In an example, the graphics display device 1510, alphanumeric input device 1512, and UI navigation device 1514 may be a touch screen display. The machine 1500 may additionally include a storage device (i.e., drive unit) 1516, a network interface device/transceiver 1520 coupled to antenna(s) 1530, and one or more sensors 1528, such as a global positioning system (GPS) sensor, a compass, an accelerometer, or other sensor. The machine 1500 may include an output controller 1534, such as a serial (e.g., universal serial bus (USB)), parallel, or other wired or wireless (e.g., infrared (IR)), near field communication (NFC), etc. connection to communicate with or control one or more peripheral devices (e.g., a printer, a card reader, etc.).

The storage device 1516 may include a machine readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within the static memory 1506, or within the hardware processor 1502 during execution thereof by the machine 1500. In an example, one or any combination of the hardware processor 1502, the main memory 1504, the static memory 1506, or the storage device 1516 may constitute machine-readable media.

While the machine-readable medium 1522 is illustrated as a single medium, the term "machine-readable medium" may include a single medium or multiple media (e.g., a centralized or distributed database, and/or associated caches and servers) configured to store the one or more instructions 1524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1500 and that cause the machine 1500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1524 may further be transmitted or received over a communications network 1526 using a transmission medium via the network interface device/transceiver 1520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1520 may include one or more physical jacks (e.g., Ethernet, coaxial, or phone jacks) or one or more antennas to connect to the communications network 1526. In an example, the network interface device/transceiver 1520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1500 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A vehicle comprising:
a liftgate;
a sensor;
a processor; and
memory storing computer-executable instructions, that when executed by the processor, cause the processor to:
determine a first value for a baseline signal for activation of the liftgate;
receive a first signal from the sensor;
determine that the first signal is greater than the first value by a first threshold amount;
activate, by the vehicle and based on determining that the first signal is greater than the first value by the first threshold amount, the liftgate of the vehicle;
adjust, subsequent to activating the liftgate and prior to the liftgate closing, the baseline signal for activation of the liftgate from the first value to a second value, wherein the second value is greater than the first value;
receive a second signal from the sensor that is greater than the first value and less than the second value;
prevent, based on the second signal being greater than the first value, the liftgate from closing;
receive a third signal from the sensor that is less than or equal to the first value;
adjust, based on the third signal being less than or equal to the first value, the baseline signal for activation of the liftgate back from the second value to the first value;
receive a fourth signal from the sensor that is greater than the first value by the first threshold amount; and
close, by the vehicle and based on the determination that fourth signal is greater than the first value by the first threshold amount, the liftgate.

2. The vehicle of claim 1, wherein the first signal indicates proximity of a user or object to a bumper of the vehicle.

3. The vehicle of claim 1, wherein the sensor is at least one of: a capacitive sensor, an ultrasonic sensor, radar, and lidar.

4. The vehicle of claim 1, wherein the first signal is provided to a high pass filter associated with the first value, and wherein the second signal is provided to the high pass filter that is adjusted to the second value.

5. A method comprising:
- determining a first value for a baseline signal for activation of a liftgate of a vehicle;
- receiving, by the vehicle, a first signal from a sensor of the vehicle;
- determining, by the vehicle, that the first signal is greater than the first value by a first threshold amount;
- activating, by the vehicle and based on determining that the first signal is greater than the first value by the first threshold amount, the liftgate of the vehicle;
- adjusting, subsequent to activating the liftgate and prior to the liftgate closing, the baseline signal for activation of the liftgate from the first value to a second value, wherein the second value is greater than the first value;
- receiving a second signal from the sensor that is greater than the first value and less than the second value;
- preventing, based on the second signal being greater than the first value, the liftgate from closing;
- receiving a third signal from the sensor that is less than or equal to the first value;
- adjusting, based on the third signal being less than or equal to the first value, the baseline signal for activation of the liftgate back from the second value to the first value;
- receiving a fourth signal from the sensor that is greater than the first value by the first threshold amount; and
- closing, by the vehicle and based on the determination that fourth signal is greater than the first value by the first threshold amount, the liftgate.

6. The method of claim 5, wherein the first signal indicates proximity of a user or object to a bumper of the vehicle.

7. The method of claim 5, wherein the sensor is at least one of: a capacitive sensor, an ultrasonic sensor, radar, and lidar.

8. A non-transitory computer-readable medium storing computer-executable instructions, that when executed by a processor, cause the processor to perform operations of:
- determining a first value for a baseline signal for activation of a liftgate of a vehicle;
- receiving, by the vehicle, a first signal from a sensor of the vehicle;
- determining, by the vehicle, that the first signal is greater than the first value by a first threshold amount;
- activating, by the vehicle and based on determining that the first signal is greater than the first value by the first threshold amount, the liftgate of the vehicle;
- adjusting, by the vehicle, subsequent to activating the liftgate and prior to the liftgate closing, the baseline signal for activation of the liftgate from the first value to a second value; wherein the second value baseline signal is greater than the first value baseline signal;
- receiving a second signal from the sensor that is greater than the first value and less than the second value;
- preventing, based on the second signal being greater than the first value, the liftgate from closing;
- receiving a third signal from the sensor that is less than or equal to the first value;
- adjusting, based on the third signal being less than or equal to the first value, the baseline signal for activation of the liftgate back from the second value to the first value;
- receiving a fourth signal from the sensor that is greater than the first value by the first threshold amount; and
- closing, by the vehicle and based on the determination that fourth signal is greater than the first value by the first threshold amount, the liftgate.

9. The non-transitory computer-readable medium of claim 8, wherein the first signal indicates proximity of a user or object to a bumper of the vehicle.

\* \* \* \* \*